May 28, 1935.  G. J. DEHN  2,003,140

GREASE TRAP

Filed April 22, 1933  2 Sheets-Sheet 1

Inventor
George J. Dehn
By Fred Gerlach his Atty.

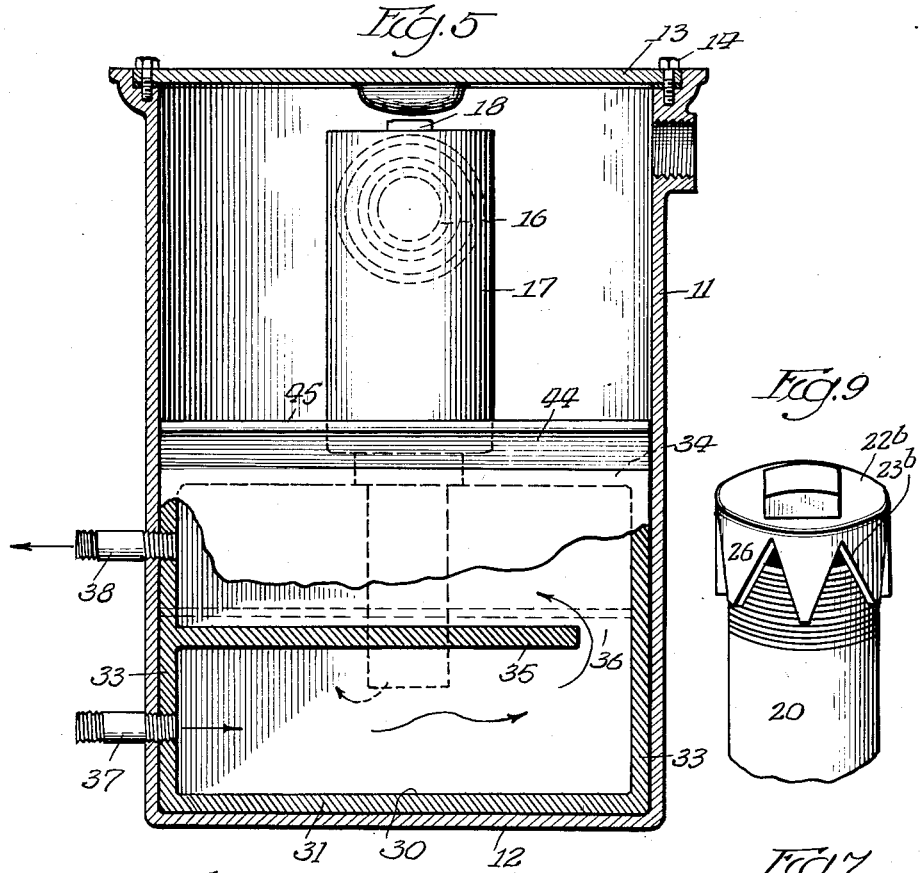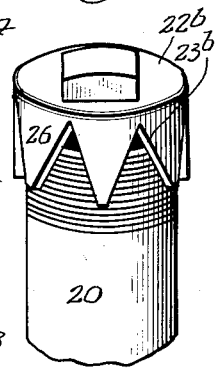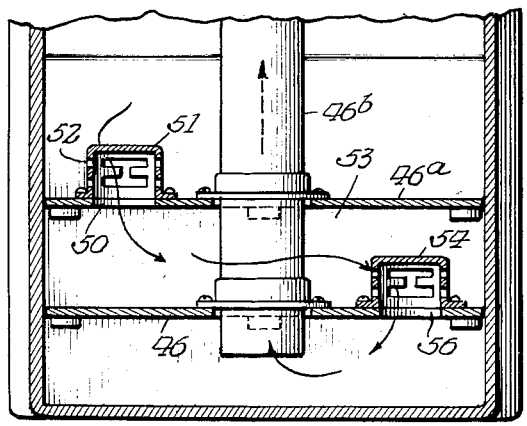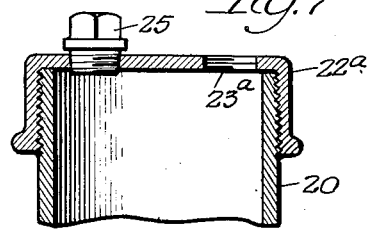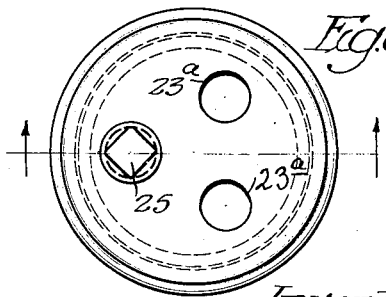

Patented May 28, 1935

2,003,140

UNITED STATES PATENT OFFICE 2,003,140

GREASE TRAP

George J. Dehn, Chicago, Ill.

Application April 22, 1933, Serial No. 667,390

21 Claims. (Cl. 210—56)

The invention relates generally to grease traps. More particularly the invention relates to that type of grease trap which is used primarily in pipe systems for drainage and comprises a basin which is connected in the system so that the drainage flows therethrough, and has means for baffling and cooling the drainage so as to congeal the grease and separate it from the drainage.

One object of the invention is to provide a grease trap of this type having means for regulating or restricting the flow of the drainage through the basin so the rate of flow will not be in excess of that necessary effectively to separate substantially all the grease from the drainage.

Another object of the invention is to provide a grease trap of the last mentioned character in which means for regulating or controlling the flow of drainage through the basin is disposed in the basin and is housed so that it is not likely to be tampered with.

Another object of the invention is to provide a grease trap of the type under consideration having improved means for separating the solids from the drainage before the latter passes to the cooling means in the basin.

A further object of the invention is to increase the separating efficiency of the trap by providing a system of baffles for directing and retarding the flow of the drainage to and around the cooling means and before the drainage is discharged from the basin.

Other objects of the invention and the various advantages and characteristics of the present grease trap construction will be apparent from a consideration of the following detailed description.

The invention consists in the several novel features which are hereinafter set forth and are more particularly defined by the claims at the conclusion hereof.

Figure 1:
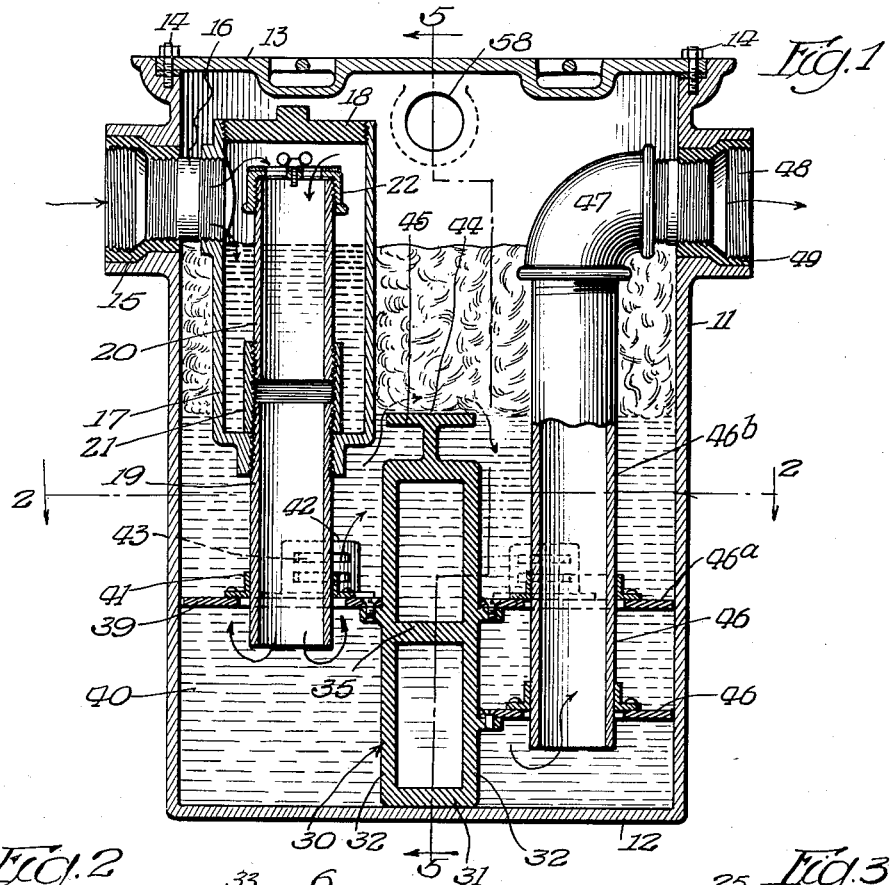
Figure 2:
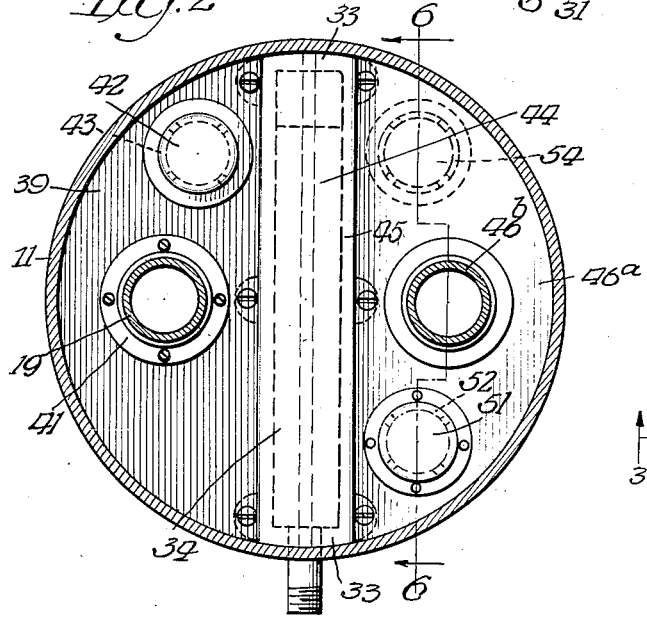
Figure 3:
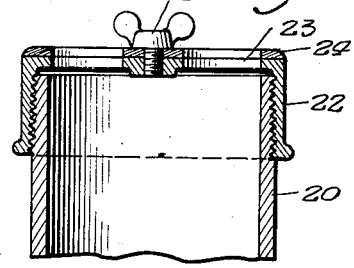
Figure 4:
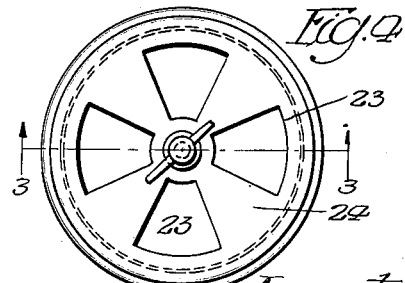

In the drawings which accompany and form a part of the present description or specification and in which like numerals of reference denote corresponding parts throughout the several views: Fig. 1 is a vertical section of a trap embodying the preferred form of the invention. Fig. 2 is a horizontal section on the line 2—2 of Fig. 1. Figs. 3 and 4 are detail views showing the means for regulating or controlling the flow of the drainage through the basin. Fig. 5 is a vertical section on the line 5—5 of Fig. 1. Fig. 6 is a section on the line 6—6 of Fig. 2. Figs. 7 and 8 are detail views of a modified form of device for regulating or controlling the rate of flow of the drainage through the basin. Fig. 9 is a fragmentary perspective of another modified form of flow control device.

The grease trap which is shown in Figs. 1 to 6 of the drawings and involves the preferred form of the invention, comprises: a basin having a cylindrical side wall 11 and an integral bottom 12. This basin has an open top and is normally closed by a cover 13 which is removably secured to the top margin of the side wall 11 by screws 14. A bushing 15 is fixed in or cast integrally with the side wall of the basin and embodies a screw thread for connection with a drainage-conducting pipe, as well understood in the art. A nipple 16 has its outer end threaded to the inner end of the bushing 15 to deliver the drainage from the pipe into the basin. The inner end of the nipple 16 is threaded into the upper portion of a tubular closed receptacle 17 into which the drainage flows from the nipple 16. The top of the receptacle 17 is closed by a screw-plug 18 which is removable to permit access to the inside of the receptacle. The drainage is discharged from the upper portion of the receptacle through a downwardly extending pipe which is composed of a lower section 19 which is screw-threaded into the bottom of the receptacle 17, an upper section 20 and a coupling sleeve 21 into which the lower end of pipe section 20 and the upper end of pipe section 19 are threaded. The lower end of pipe section 20 is open to discharge the drainage into the basin. The receptacle serves to catch and retain the solids in the drainage. The accumulated matter can be periodically removed through the top of the receptacle when the plug 18 is removed.

In grease traps of this type, it has been found that the separating efficiency depends in great measure upon having a proper rate of flow of the drainage so that the grease in transit through the basin will coagulate and coalesce before it passes into the pipe 20, 19. To permit the rate of flow to be controlled or regulated, means is provided in the basin by which the flow of drainage through the pipe 20, 19 is checked or regulated. In the form of the invention illustrated in Figs. 1 to 6, a cap 22 is screw-threaded to the upper end of the pipe section 20 and is provided with segmental openings 23 in its top wall. A valve 24 having openings adapted to register in whole or in part with the openings 23, is pivoted on top of the cap and is adapted to be locked in any adjusted position by a set screw 25. By varying the effective area of the openings 23 through a setting of the valve 24, the flow of drainage into the pipe section 20 can be regulated so that the rate of flow will be such as to permit the flow of the drainage to be checked or retarded sufficiently to effect thorough separation of the grease from the drainage. By virtue of the fact that the flow control means is housed in the receptacle 17 there is little if any likelihood of the means being tampered with.

In Figs. 7 and 8, a modified form of flow controlling means is illustrated. This means consists of a cap $22^a$ which is screw-threaded to the pipe section 20 and is provided with a series of holes $23^a$. Plugs 25 are provided. By closing one or two of the holes with plugs 25, the rate of flow may be varied as desired. In Fig. 9 a further modification of the flow control means is illustrated in which the screw cap $22^b$ is provided with an interiorly threaded flange 26 having triangular or wedge-shaped notches $23^b$ formed in the flange. By adjusting the cap upwardly or downwardly, the area of the openings above the pipe section 20 left by the notches may be increased or decreased to regulate the flow of drainage into said pipe section. These constructions exemplify means for regulating the inflow of the drainage and the rate of flow through the basin. As a result, the rate of flow may be varied to effect substantially complete separation of the grease from the drainage as hereinafter set forth. In some instances, the character of the grease is such that a lower rate of flow is required than for others and by correspondingly adjusting the inflow, it becomes possible to provide for efficient separation of the drainage containing more or less grease and grease of different characters.

The trap is provided with a cooling unit 30 which extends diametrically across the lower portion of the basin and consists of a hollow cast shell. This shell comprises a bottom 31, side walls 32, end walls 33, a top wall 34 and a horizontal partition 35 which terminates so as to leave an opening 36 at one end. An inlet pipe 37 for cooling water is threaded into one of the end walls 33 below the partition 35 and an outlet pipe 38 is threaded into the same end wall above the partition 35. Water entering the pipe 37 flows through the chamber below the partition 35, then upwardly through opening 36 and then backwardly across the chamber above the partition to the outlet pipe 38. This construction insures the flow of cooling water through all portions of the cooling unit.

This cooling unit forms a bridge which extends across the lower portion of the basin so that the drainage must pass in contact with the side wall of the cooling unit at the inlet side where the pipe section 19 delivers the drainage, and over the unit to reach the discharge pipe at the other side of the unit. The cooling unit is provided with an integral upwardly extending wall 44 with laterally extending ribs or flanges 45 around which the drainage must flow in passing from one side of the cooling unit to the other. This construction retards the flow to aid in separating the grease from the drainage as it flows over the cooling unit.

The lower end of pipe section 19 passes through a horizontal baffle 39 which extends between one side wall of the cooling unit and the side of the basin so that the drainage will be discharged from the pipe section 19 into the chamber 40 below said baffle. Pipe section 19 extends through a flanged ring 41 which is secured to the top of the baffle. The drainage from the chamber 40 flows upwardly through an opening in the baffle 29 which is covered by a hood or cap 42 which is secured to the top of said baffle and has a closed top and openings 43 formed in its side wall through which the drainage will flow laterally into the space above the baffle at one side of the cooling unit. From the space above the baffle 29, the drainage flows over the cooling unit. A lower baffle 46 and an upper baffle $46^a$ extend the space at the discharge side of the cooling unit and from the unit to the side of the basin. A discharge pipe $46^b$ for the drainage from which the grease has been separated, has its lower end open to receive the drainage and extends upwardly through both of the baffles 46 and $46^a$ to an elbow 47 which is connected by a nipple 48 to an outlet bushing 49 in the basin wall. An opening 50 is formed in the baffle 46 and is covered by a hood 51 which is secured on said baffle and has a closed top and openings 52 in its cylindrical wall to retard the flow of the drainage into the chamber 53 between baffles 46, 45. The drainage entering the chamber 53 through hood 51 flows across the basin at one side of the cooling unit to a hood 54 which is similar in construction to the hoods 51 and 42. From hood 54, the drainage flows through the opening 55 in the lower baffle 45 to the chamber 56 below said baffle. The drainage from chamber 56 flows upwardly through the discharge pipe 46 to the outlet in the basin.

In operation, the drainage is discharged into the closed receptacle 17 where the solids are separated so they will be retained on its bottom around pipe 20. The drainage then flows into the top of pipe 20 through the regulating device by which the maximum rate of flow of the drainage through the trap is controlled. After passing through the regulating device, the drainage flows downwardly through pipe sections 20, 19 into the chamber 40 below the baffle 39 where it contacts with one side of the lower portion of the cooling unit. Next the drainage passes upwardly through the hood 42 into the space above baffle 39, at one side of the cooling unit. The drainage there contacts with the upper portion of one side of the cooling unit and passes around and over the baffle-ribs 45 to the other side of the cooling unit. The hoods 42 and 51 are disposed at diametrically opposite points so that the drainage must travel over the cooling unit and across the basin to reach the hood 51 through which the drainage flows into the chamber 53 below baffle 46. The drainage next passes along the discharge side of the cooling unit in chamber 53 to the hood 54. Next the drainage flows through the hood 54 into the chamber 56 below baffle 45 and into the lower end of the discharge pipe. This construction has been found in practice to result in a substantially complete separation of the grease from the drainage so the grease will be retained in the basin above the cooling unit. A vent pipe is usually connected to an opening 58 in the upper portion of the basin. The drainage flows into the chamber 40 below the baffle 39 where it is confined to contact with one side of the cooling unit, then upwardly through baffle 39 and laterally from the hood 42, then over and across the cooling unit, then through cap 51 and baffle 46 at the discharge side of the cooling unit and across the chamber between baffles 46, 45, then through hood 54 into the chamber below the baffle 45, and then upwardly to and through the discharge pipe.

The invention exemplifies a grease trap which is equipped with means for varying the rate of flow of the drainage through the basin so that the grease will be coalesced and coagulated before it reaches the discharge and will be retained in the basin. In practice, it has been found that by varying the rate of flow through the basin, practically complete separation of the grease from the drainage is obtained. The invention also exemplifies a trap structure for directing the flow to cool thoroughly the drainage and for effective and substantially complete separation of the grease.

The invention is not to be understood to be restricted to the details set forth and may be modified within the scope of the appended claims without departing from the spirit and scope of the invention.

Having thus described the invention, what I claim as new and desire to secure by Letters Patent, is:

1. In a grease trap of the character described, the combination of a basin provided with an inlet and an outlet for drainage and having a removable cover, means in the basin for separating grease from the drainage as the latter flows through the basin, and means for varying the rate of flow of the drainage through the basin, disposed wholly within the basin and accessible for manipulation only when the cover is removed from the basin.

2. In a grease trap of the character described, the combination of a basin provided with an inlet and an outlet for drainage and having a removable cover, a vertical pipe in the basin through which the drainage flows from the inlet to the outlet, means in the basin for separating grease from the drainage, and means for varying the rate of flow of the drainage through the pipe, associated with the upper end of the pipe and disposed wholly within the basin so that it is only accessible for manipulation when the cover is removed from the basin.

3. In a grease trap of the character described, the combination of a basin provided with an inlet and an outlet for drainage and having a removable cover, means in the basin for separating grease from the drainage including a cooling unit and adjustable valve means for varying the rate of flow of the drainage around the cooling unit and through the basin, disposed wholly within the basin and accessible for manipulation or adjustment only when the cover is removed from the basin.

4. In a grease trap of the character described, the combination of a basin provided with a horizontal pipe for delivering drainage thereto, a closed receptacle for retaining solids disposed in the basin and arranged so that the pipe discharges into the upper portion thereof, a second pipe extending vertically through the bottom of the receptacle and having an opening at its upper end substantially in line with the horizontal pipe to permit the drainage in the receptacle to flow into the pipe and its lower end extending through the bottom of the receptacle and into the basin, means in the basin for separating grease from the drainage, and a conduit for conducting the drainage from the basin.

5. In a grease trap of the character described, the combination of a basin provided with a horizontal inlet nipple for delivering drainage thereto, a closed receptacle for retaining solids, connected to receive the drainage from the inlet nipple and disposed in the basin, a pipe extending vertically through the bottom of the receptacle having an opening at its upper end substantially in line with the nipple to permit the drainage in the receptacle to flow downwardly through the pipe and its lower end extending through the bottom of the receptacle and into the bottom of the basin, means in the basin for separating grease from the drainage, and a conduit for conducting the drainage from the basin.

6. In a grease trap of the character described, the combination of a basin provided with a horizontal inlet nipple for delivering drainage thereto, a closed receptacle for retaining solids disposed in the basin and arranged so that the nipple discharges the drainage into the upper portion thereof, a vertical pipe comprising superposed sections, the upper of which is in the receptacle and has its upper end disposed substantially in line with the nipple open to permit the drainage to flow downwardly through the pipe and the lower end of which extends through the bottom of the receptacle and into the bottom of the basin, means in the basin for separating grease from the drainage as the latter flows through the basin, and a conduit for conducting the drainage from the basin.

7. In a grease trap of the character described, the combination of a basin provided with an inlet for drainage, a bridge extending across the lower portion of the basin over which the drainage flows, a downwardly extending pipe connected to receive the drainage from said inlet and discharge it downwardly in the basin at one side of the bridge, a substantially horizontal baffle between the bridge and one side of the basin, through which the drainage is discharged by said pipe, and an outlet conduit at the other side of the bridge, for conducting the drainage upwardly from the lower portion of the other side of the basin.

8. In a grease trap, of the character described, the combination of a basin provided with an inlet for drainage, a bridge extending across the lower portion of the basin over which the drainage flows, a downwardly extending pipe connected to receive the drainage from said inlet and discharge it downwardly in the basin at one side of the bridge, a substantially horizontal baffle between the bridge and one side of the basin, through which the drainage is discharged by said pipe, a substantially horizontal second baffle between the bridge and the other side of the basin, and an outlet conduit at the other side of the bridge for conducting the drainage upwardly from the lower portion of said other side of the basin below the second baffle.

9. In a grease trap of the character described, the combination of a basin provided with an inlet for drainage, a bridge extending across the lower portion of the basin over which the drainage flows, a downwardly extending pipe connected to receive the drainage from said inlet and discharge it downwardly in the basin at one side of the bridge, a substantially horizontal baffle between the bridge and one side of the basin through which the drainage is discharged by said pipe, a plurality of baffles between the other side of the bridge and the basin, and an outlet conduit at the other side of the bridge for conducting the drainage upwardly from the lower portion of the basin and through the plurality of baffles.

10. In a grease trap of the character described, the combination of a basin provided with an inlet for drainage, a vertical pipe connected to receive drainage from said inlet and discharge it downwardly in the basin, a horizontally extending baffle disposed in the basin in spaced relation with the basin bottom to form a chamber between it and said basin bottom and having an opening therein through which the lower end of the pipe extends so that the latter discharges into said chamber, said baffle having another opening therein for permitting the drainage to flow upwardly out of the chamber, a perforated hood over the last mentioned opening for retarding the flow of drainage therethrough, and an outlet connection for conducting the drainage out of the basin.

11. In a grease trap, of the character described, the combination of a basin provided with an inlet for drainage, a bridge extending across the lower portion of the basin over which the drainage flows, a downwardly extending pipe connected to receive drainage from said inlet and discharge it downwardly in the basin at one side of the bridge, a baffle between the bridge and one side of the basin through which the drainage is discharged by said pipe, a perforated cap over an opening in the baffle through which the drainage passes, and an outlet conduit at the other side of the bridge for conducting the drainage upwardly from the lower portion of the other side of the basin and out of said basin.

12. In a grease trap of the character described, the combination of a basin provided with an inlet for drainage, a bridge extending across the lower portion of the basin over which the drainage flows, a downwardly extending pipe connected to receive the drainage from said inlet and discharge it downwardly in the basin at one side of the bridge, a substantially horizontal baffle between the bridge and one side of the basin through which the drainage is discharged by said pipe, a substantially horizontal second baffle between the bridge and the other side of the basin, perforated caps over openings in the baffles through which the drainage flows, and an outlet conduit for the drainage.

13. In a grease trap of the character described, the combination of a basin provided with an inlet for drainage, a hollow cooling unit fitting in and extending across the bottom of the basin and provided with a partition dividing the space in the unit into upper and lower chambers, inlet and outlet pipes for a cooling medium connected to one end of the unit and to the chambers below and above the partition respectively, the partition having an opening adjacent the other end of the unit to cause the cooling medium to flow back and forth across the unit, a downwardly extending pipe connected to receive the drainage from the inlet and to discharge it downwardly in the basin at one side of the unit, and an outlet connection for the drainage at the other side of the cooling unit.

14. In a grease trap of the character described, the combination of a basin provided with an inlet for drainage, a hollow cooling unit fitting in and extending across the bottom of the basin and provided with a partition dividing the space in the unit into upper and lower chambers, inlet and outlet pipes connected to one end of the unit and to the chambers above and below the partition respectively, the partition having an opening adjacent the other end of the unit to cause the cooling liquid to flow back and forth across the unit, a downwardly extending pipe connected to receive the drainage from the inlet and to discharge it downwardly in the basin at one side of the unit, an integral ribbed wall on the top of the unit for retarding the flow of the drainage from said one side to the other, and an outlet connection for the drainage at said other side of the cooling unit.

15. In a grease trap of the character described, the combination of a basin, an inlet for delivering drainage into the basin, a vertical pipe connected to receive drainage from said inlet and discharge it downwardly into the lower portion of the basin, an outlet connection comprising a vertical pipe to receive drainage and conduct it upwardly from the lower portion of the basin and pass it out of the basin, a hollow cooling unit extending transversely across the basin between the two pipes, and a baffle between one side of the unit and the side of the basin, through which the inlet pipe discharges the drainage.

16. In a grease trap of the character described, the combination of a basin, an inlet for delivering drainage into the basin, a vertical pipe connected to receive drainage from said inlet and to discharge it downwardly into the lower portion of the basin, an outlet connection comprising a vertical pipe to receive the drainage and conduct it upwardly from the lower portion of the basin and discharge it from said basin, a hollow cooling unit extending transversely across the basin between the two pipes, and baffles between the sides of the unit and the side wall of the basin having openings therein through which the lower ends of the pipes extend and additional openings for the passage of the drainage therethrough.

17. In a grease trap of the character described, the combination of a basin, an inlet for delivering drainage into the basin, a vertical pipe connected to receive the drainage from said inlet and discharge it downwardly into the lower portion of the basin, an outlet connection comprising a vertical pipe to receive the drainage and conduct it upwardly from the lower portion of the basin and discharge it from said basin, a hollow cooling unit extending transversely across the basin between the two pipes, a baffle between one side of the unit and the side of the basin having an opening through which the lower end of the inlet pipe extends and also having an additional opening to permit the drainage to flow upwardly from the space beneath said baffle for flow over the cooling unit, and a plurality of baffles between the other side of the unit and the basin having aligned openings through which the lower end of the discharge pipe extends and also having openings for permitting the drainage to flow downwardly into the space beneath the lowermost of said baffles.

18. In a grease trap of the character described, the combination of a basin provided with an inlet and an outlet for the circulation of drainage therethrough, means in the basin for separating grease from the drainage as the latter flows through the basin, means also in the basin whereby the rate of flow of the drainage through the basin may be varied and housing means in the basin extending around and encasing the flow varying means.

19. In a grease trap of the character described the combination of a basin provided with an inlet and an outlet for the circulation of drainage therethrough, a closed receptacle for retaining solids disposed in the basin and connected to the inlet so as to receive the drainage therefrom, a vertical pipe extending downwardly through the receptacle and serving to discharge the drainage after removal of solids therefrom downwardly through the receptacle into the bottom of the basin, and means in the receptacle for controlling the rate of flow of the drainage through the pipe.

20. In a grease trap of the character described, the combination of a basin provided with an inlet and an outlet for the circulation of drainage therethrough, a closed receptacle for retaining solids disposed in the basin and connected to the inlet so as to receive the drainage therefrom, a vertical pipe extending downwardly through the receptacle and serving to discharge the drainage after removal of solids therefrom downwardly through the receptacle into the bottom of the basin, and valve means applied to the upper end of the pipe and disposed in the receptacle for controlling the rate of flow of the drainage through the pipe.

21. In a grease trap of the character described, the combination of a basin provided with an inlet and an outlet for the circulation of drainage therethrough, means in the basin for separating grease from the drainage as the latter flows through the basin, means associated with the basin whereby the rate of flow of the drainage through said basin may be varied, and means for averting tampering with the flow varying means comprising a housing extending around and completely enclosing the last mentioned means.

GEORGE J. DEHN.